US005105334A

United States Patent [19]

Holinka

[11] Patent Number: 5,105,334

[45] Date of Patent: Apr. 14, 1992

[54] ELECTRICAL HOUSING FOR AN OUTBOARD MOTOR

[75] Inventor: Ronald M. Holinka, Oshkosh, Wis.

[73] Assignee: Brunswick Corporation, Skokie, Ill.

[21] Appl. No.: 649,475

[22] Filed: Feb. 1, 1991

[51] Int. Cl.[5] ........................ H02B 1/00; B63H 21/26

[52] U.S. Cl. .................................... 361/380; 361/394; 361/399; 361/415; 361/420; 174/50; 174/35 GC; 440/76; 440/900

[58] Field of Search ............... 361/380, 392, 393, 394, 361/395, 396, 397, 398, 399, 417, 418, 419, 420, 427; 174/50, 50.5, 50.51, 35 GC; 440/52, 76, 77, 88, 900; 248/188, 189, 615, 635

[56] References Cited

U.S. PATENT DOCUMENTS 2,816,252 10/1957 Sanders, Jr. .
2,907,926 7/1959 Slack .
3,506,877 4/1970 Owen .
4,499,523 1/1985 Gillett et al. ........................ 361/383
4,632,662 12/1986 Handa .................................. 440/52
4,808,115 9/1989 Norton et al. ........................ 439/79
4,872,844 12/1989 Grebe et al. .......................... 439/69
4,899,256 1/1990 Sway-Tin ............................ 361/386
4,933,809 6/1990 Boede et al. ........................ 361/395
4,963,110 10/1990 Otani et al. .......................... 440/89

*Primary Examiner*—Leo P. Picard
*Assistant Examiner*—Young S. Whang
*Attorney, Agent, or Firm*—Andrus, Sceales, Starke & Sawall

[57] ABSTRACT

An electrical component housing for the powerhead of an outboard motor in which the housing is mounted to the engine between oppositely slanted cylinder banks, which provide a V-shaped engine. The engine is mounted to an adaptor plate, and the electrical component housing is interconnected with the adaptor plate through projections provided on the housing which are received within recesses formed in the adaptor plate. Mounting flanges are provided at the upper portion of the electrical component housing, and are secured in mounting surfaces associated with the engine.

17 Claims, 2 Drawing Sheets

FIG. 3
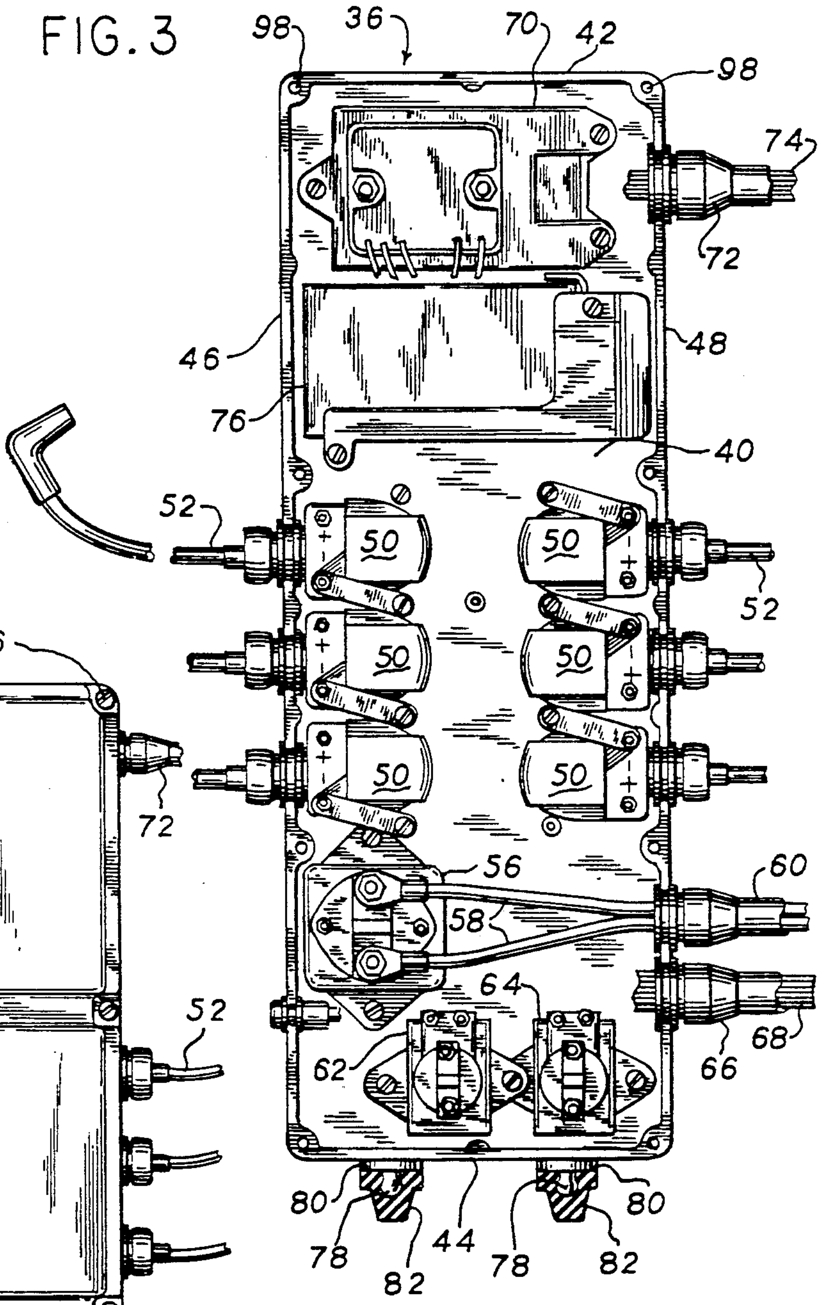
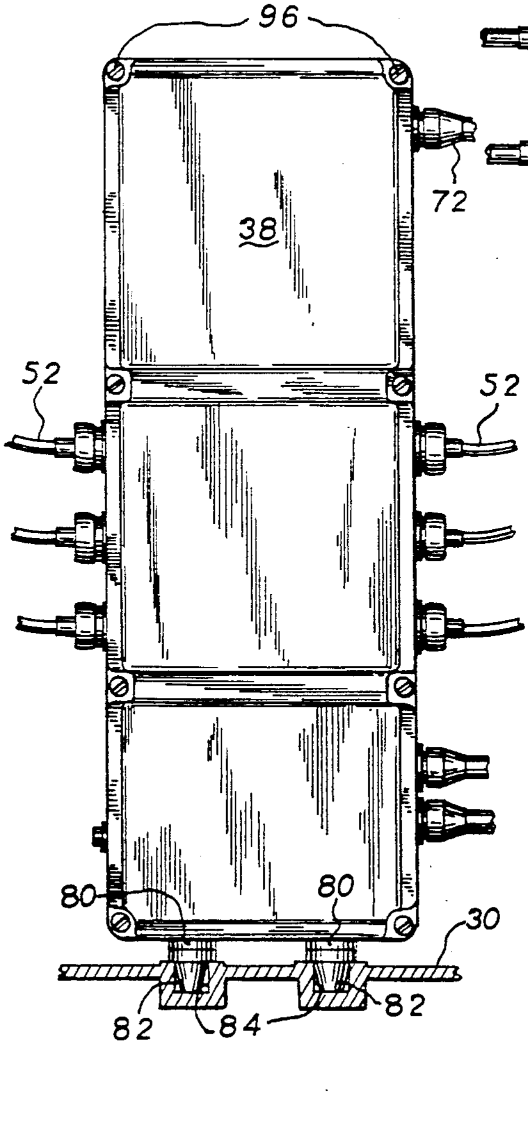
FIG. 4

ELECTRICAL HOUSING FOR AN OUTBOARD MOTOR

BACKGROUND AND SUMMARY

This invention relates to an outboard marine propulsion system, and more particularly to mounting of electrical components to the engine associated with an outboard motor.

An internal combustion engine employed in the powerhead of an outboard motor typically includes a number of electrical or electronic components, which must be mounted to the engine. In the past, it has been known to mount electrical or electronic components at various locations on the engine, as space allowed and as required by the desired location of the component. This resulted in many components being scattered throughout various locations on the engine. During assembly, each component would be separately mounted to the engine, and appropriate leads connected to the component. Accordingly, such assembly entailed a multi-step process for each component.

In addition, water is always present in the operating environment of an outboard motor, and it is important that the electrical and the electronic components be guarded against exposure to excessive moisture.

Boede, et al. U.S. Pat. No. 4,933,809 discloses a modular assembly of electrical components within a box, with leads extending from the box. The box is adapted for mounting to the engine by means of mounting bosses.

It is an object of the present invention to address the concerns noted above, namely mounting the electrical components in various locations on the engine, and shielding the components from moisture. It is a further object of the invention to contain the majority of the electrical components within a single housing, and to efficiently locate the housing on the engine. It is another object of the invention to simplify assembly of electrical components to the engine.

In accordance with one aspect of the invention, in which the engine is provided with a pair of oppositely slanted cylinder banks forming a V-shaped engine, a modular electrical component housing is mounted to the engine and located within the valley of the V-shape between the cylinder banks. A majority of the engine electrical components are contained within the housing. The housing is in the form of a box having walls defining a housing interior within which the electrical components are secured, and a cover is mounted to the box for enclosing the housing interior. In an outboard motor including an adaptor plate mounted between the engine and the upper end of a driveshaft housing, the electrical component housing is interconnected with the adaptor plate. The interconnection of the electrical housing with the adaptor plate is accomplished by forming upwardly facing recesses or pockets in the upper surface of the adaptor plate, and providing projections extending from the lower wall of the housing, which are adapted for placement within the recesses formed in the adaptor plate. Resilient material, such as rubber, is provided on the projections for isolating the electrical component housing from vibrations. A mounting flange is provided on the electrical housing toward its upper end, and is adapted for connection to a mounting surface provided on the engine.

The invention further contemplates a method of mounting electrical components to an internal combustion engine, substantially in accordance with the foregoing summary.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is an end elevation view of the electrical component housing of the invention, reference being made to line 3—3 of FIG. 1 and;

FIG. 4 is a view similar to FIG. 3, showing the electrical component housing with the cover mounted thereto.

DETAILED DESCRIPTION OF THE PREFERRED EMBODIMENT

Figure 1:
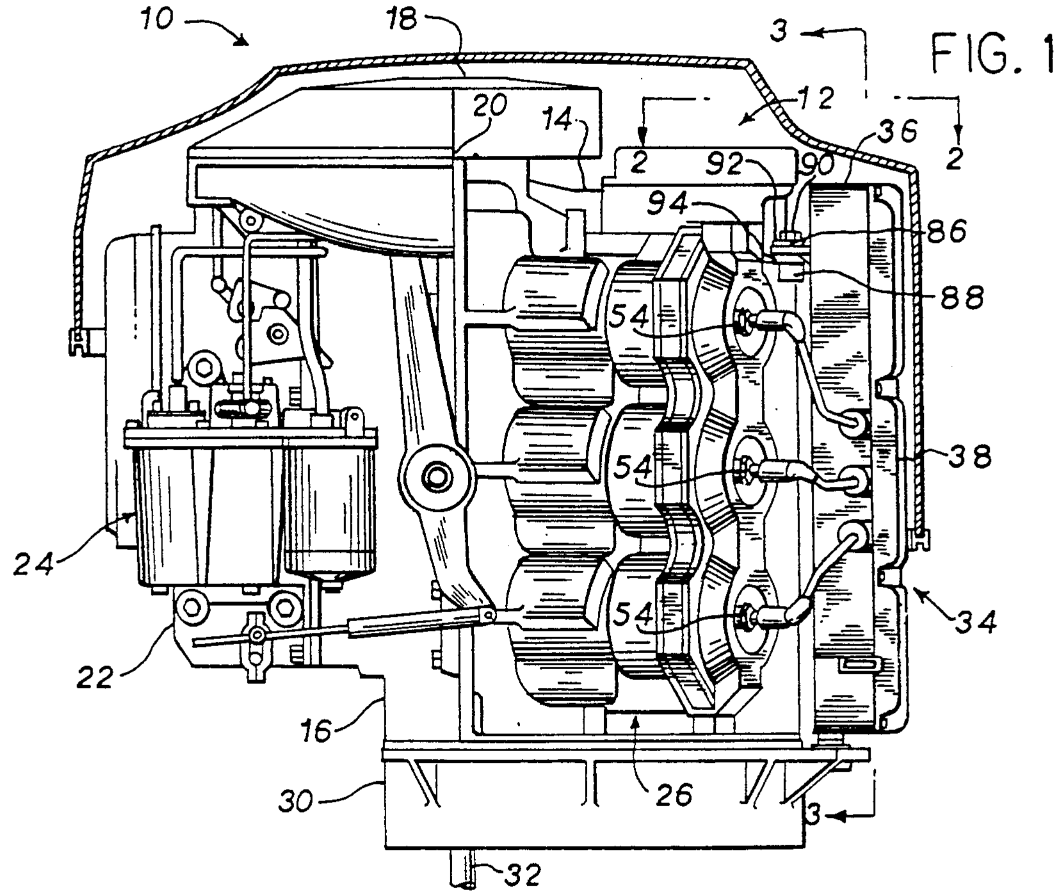
FIG. 1 is a side elevation view of an internal combustion engine comprising the powerhead of an outboard motor, incorporating the electrical component housing of the invention.

FIG. 1 illustrates an outboard motor 10. An internal combustion engine 12 comprises the powerhead of outboard motor 10, and includes an engine block 14 to which a crankcase 16 is mounted. An air intake assembly 18 is mounted to the upper end of engine 12, and supplies intake air through an intake opening 20 to an air intake box 22. Intake air is supplied from air intake box 22 to crankcase 16, and from crankcase 16 to the engine cylinders, in accordance with known 2-stroke cycle engine operation.

A vapor separator assembly 24 is mounted to the side of air intake box 22, for separating vapors out of the fuel, and for filtering water and containments from the fuel. Fuel injectors (not shown) are mounted to engine 12 for injecting fuel into crankcase 16 to provide an air-fuel mixture, as is known.

Figure 2:
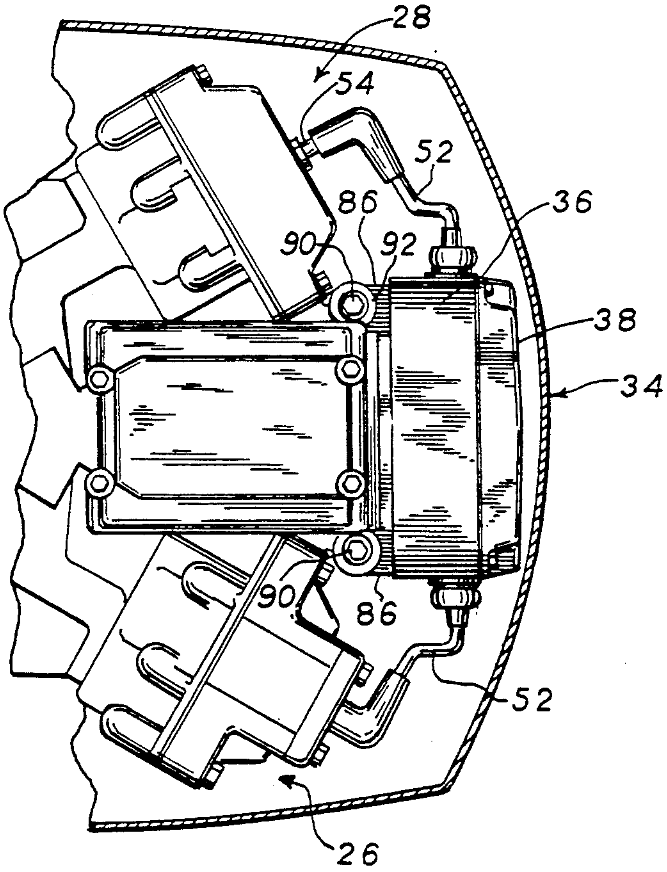
FIG. 2 is a partial top plan view of the engine of FIG. 1, reference being made to line 2—2 of FIG. 1.

Engine block 14 defines a pair of oppositely slanted, vertically oriented cylinder banks, shown in FIGS. 1 and 2 at 26, 28. Cylinder banks 26, 28 each include three horizontally oriented cylinders, to define a vertical, axis V-6 engine.

The lower end of engine block 14 and crankcase 16 are mounted to an adaptor plate 30 (FIG. 1), which is connected to the upper end of a driveshaft housing (not shown), in accordance with known construction of an outboard motor. Adaptor plate 30 includes openings for accommodating passage of a driveshaft 32 therethrough, which is rotatably driven by the crank shaft of engine 12. Adaptor plate 30 further includes openings for allowing passage of exhaust gases into an exhaust cavity provided in the driveshaft housing as well as for providing flow of cooling water into and out of engine 12.

An electrical component housing 34 is mounted to engine 12, and is located between cylinder banks 26, 28 within the valley of the V-shape defined by banks 26, 28. As will be explained, electrical component housing 34 houses within its interior a majority of the electrical components associated with outboard motor 10.

Electrical component housing 34 includes a body portion or box 36 and a cover 38. Box 36 and cover 38 are preferably formed from a die cast aluminum material, which is desirable for its light weight and corrosion resistance. Box 36 includes a front wall 40 (FIG. 3) facing engine 12, a top wall 42, a bottom wall 44, and a pair of side walls 46, 48. Walls 40–48 cooperate to define the interior of electrical component housing 34, within which the various electrical components associated with engine 12 are contained. FIG. 3 illustrates the electrical components housed within the interior of box 36 in one illustrative application. As shown, a series of ignition coil assemblies 50 are mounted in the central portion of box 36 adjacent side walls 46 and 48. External leads 52 are connected to starter coils 50 and are secured to side walls 46 and 48 of box 36. Leads 52 are adapted for connection to the engine spark plugs, shown at 54 in FIGS. 1 and 2. An electric starter solenoid 56 is mounted within the interior of box 36 adjacent sidewall 46. Wires 58 are connected to starter solenoid 56, and are contained within an external cable 60 which is secured to box sidewall 48. A pair of solenoids 62, 64 are contained within the interior of box 36 adjacent bottom wall 34. An external cable 66 is connected to side wall 48, and houses a series of wires 68, which are adapted for interconnection with solenoids 62, 64. An idle control module 70 is mounted in the uppermost portion of box 36. A cable 72 is connected to side wall 48, and houses a series of wires 74 adapted for interconnection with idle control module 70. Finally, a switchbox module 76 is mounted within box 36 immediately below idle control module 70.

Other electrical components as necessary could be contained within box 36 as required to control the components of engine 12 and outboard motor 10. Also, some of the components illustrated in FIG. 3 may be eliminated.

A pair of projections 78 extend downwardly from a pair of disk-like members 80 mounted to the outer surface of lower wall 44. A pair of rubber feet 82 are mounted to projections 78 below disk-like members 80. Projections 78 are provided with a bulge, and feet 82 each include a recess with an inner portion adapted to accept the bulge of projections 78 for securely engaging feet 82 with projections 78.

Referring to FIG. 4, adaptor plate 30 is provided with a pair of upwardly facing recesses 84. Recesses 84 receive the lower portions of feet 82, with the downwardly facing shoulders of feet 82 engaging the upper surface of adaptor plate 30 adjacent the openings into recesses 84. With this arrangement, rubber feet 82 are received within recesses 84 and isolate electrical component housing 34 from vibrations experienced by adaptor plate 30 during operation of outboard motor 10.

Referring to FIGS. 1 and 2, front wall 40 of box 36 is provided with a pair of mounting flanges 86 extending exteriorly of front wall 40 toward engine 12. Flanges 86 are adapted for placement adjacent mounting shoulders 88, provided on engine block 12. Vertical openings are formed in mounting flanges 86 and upwardly facing threaded openings are provided in mounting shoulders 88. A pair of threaded bolts 90 extend through the vertical openings formed in mounting flanges 86 and into the threaded openings formed in mounting shoulders 88, for securing the upper portion of box 36 to engine 12 at a point spaced above the interconnection of lower wall 44 with adaptor plate 30 through feet 82 and recesses 84. A pair of rubber washer 92, 94 are placed one on either side of mounting flanges 86, for isolating box 36 from vibrations during operation of engine 12.

Electrical component housing 34, with electrical components 50, 56, 62, 64, 70 and 76, and the leads connected to the components and the walls of box 36, is mounted to outboard motor 10 by first placing feet 82 into recesses 84 after engine 12 is mounted to adaptor plate 30. Box 36 is then tipped forwardly until the openings in mounting flanges 86 are located over the threaded openings in mounting shoulders 88. Rubber washers 92, 94 are then position adjacent mounting flanges 86, and bolts 90 inserted through washers 92, 94, and mounting flanges 86 and threaded into the threaded openings in mounting shoulders 88. Either before or after mounting of box 36 to engine 12, cover 38 is connected to box 36 by threading screws 96 through openings formed in the outer edges of cover 38 and into threaded openings 98 provided at corresponding locations in walls 42–48 of box 36. A gasket is positioned between box 36 and cover 38 for providing a water-tight seal therebetween, to protect the electrical components contained within electrical component housing 34.

Various alternatives and embodiments are contemplated as being within the scope of the following claims particularly pointing out and distinctly claiming the subject matter regarded as the invention.

I claim:

1. For an internal combustion engine having a pair of oppositely slanted cylinder banks forming a V-shape, with the valley of the V-shape located between the cylinder banks, wherein the engine comprises the powerhead of an outboard marine propulsion system and wherein the engine cylinder banks are arranged vertically, and wherein the outboard marine propulsion system comprises a driveshaft housing and an adaptor plate mounted to the upper end of the driveshaft housing, with the adaptor plate being disposed between the engine and the driveshaft housing, the improvement comprising a modular electrical component housing mounted to the engine and located within the valley of the V-shape between the cylinder banks, wherein a majority of electrical components associated with the engine are contained within the electrical component housing, and wherein the electrical component housing is interconnected with and supported by the adaptor plate.

2. The improvement of claim 1, wherein the electrical component housing comprises a body portion having walls defining a housing interior within which the electrical components are secured, and a cover mounted to the body portion for enclosing the housing interior.

3. The improvement of claim 2, further comprising external leads secured to the body portion walls and extending into the interior of the housing for connection to the electrical components contained therein, with the leads extending exteriorly of the housing.

4. For an internal combustion engine having a pair of oppositely slanted cylinder banks forming a V-shape, with the valley of the V-shape located between the cylinder banks, wherein the engine comprises the powerhead of an outboard marine propulsion system and wherein the engine cylinder banks are arranged vertically, and wherein the outboard marine propulsion system comprises a driveshaft housing and an adaptor plate mounted to the upper end of the driveshaft housing, with the adaptor plate being disposed between the engine and the driveshaft housing, the improvement comprising a modular electrical component housing mounted to the engine and located within the valley of the V-shape between the cylinder banks, wherein a majority of electrical components associated with the engine are contained within the electrical component housing, and wherein the electrical component housing is interconnected with and supported by the adaptor plate, wherein the adaptor plate is provided with one or more upwardly facing recesses, and further comprising one or more projections provided on the electrical component housing for mating with the one or more recesses in the adaptor plate, to interconnect the electrical component housing with the adaptor plate.

5. The improvement of claim 4, wherein the electrical component housing comprises a body portion having walls defining a housing interior within which the electrical components are secured, and a cover mounted to the body portion for enclosing the housing interior, and wherein the one or more projections extend from a lower wall of the body portion.

6. The improvement of claim 4, wherein the one or more projections are provided with resilient material engaged within the one or more recesses for isolating the electrical component housing from vibrations.

7. The improvement of claim 4, further comprising connection means for connecting the electrical component housing to the engine between the cylinder banks, the connection means being located toward the upper end of the electrical component housing.

8. The improvement of claim 7, wherein the electrical component housing comprises a body portion including a front wall facing the engine and side walls extending from the front wall defining a housing interior within which the electrical components are secured, and a cover for enclosing the housing interior, and wherein the connection means comprises:

a mounting flange extending toward the engine from the front wall of the body portion and adapted for placement adjacent a mounting surface formed on the engine and;

a connector member for securing the mounting flange to the engine mounting surface.

9. The improvement of claim 8, wherein the connector member comprises a bolt extending through an opening formed in the mounting flange and into a threaded opening formed in the engine mounting surface.

10. For an internal combustion engine associated with the powerhead of an outboard marine propulsion system including a driveshaft housing and an adaptor plate, wherein the lower end of the engine is mounted to the upper surface of the adaptor plate, with the adaptor plate being disposed between the engine and the upper end of the driveshaft housing, the improvement comprising a modular electrical component housing mounted to the engine, wherein a majority of electrical components associated with the engine are contained within the electrical component housing, and wherein the electrical component housing is interconnected with the adaptor plate by means of one or more upwardly facing recesses formed in the adaptor plate and one or more projections provided on the electrical component housing for mating with the one or more recesses in the adaptor plate, and connection means for connecting the electrical component housing to the engine between the cylinder banks, the connection means being located toward the upper end of the electrical component housing.

11. In an outboard marine propulsion system comprising a vertical axis engine including a pair of oppositely slanted cylinder banks defining a V-shape, and an adaptor plate to which the lower end of the engine is mounted, the improvement comprising:

a modular electrical component housing located within the valley of the V-shaped engine, wherein the majority of the electrical components associated with the engine are contained within the electrical component housing;

wherein the electrical component housing comprises a body portion defined by a front wall and a plurality of side walls extending therefrom and defining the interior of the electrical component housing, and a cover adapted for connection to the body portion for enclosing the housing interior;

one or more projections extending from a lower side wall of the housing body portion, and engageable with one or more upwardly facing recesses formed in the adaptor plate to interconnect the electrical component housing with the adaptor plate; and connector means for connecting the upper portion of the housing body portion to the engine above the interconnection of the electrical housing body portion with the adaptor plate.

12. A method of mounting electrical components to an internal combustion engine comprising a pair of oppositely slanted cylinder banks providing a V-shape to the engine, wherein the engine comprises the powerhead of an outboard marine propulsion system, with the engine cylinder banks being arranged vertically, and wherein the outboard marine propulsion system comprises a driveshaft housing and an adaptor plate mounted to the upper end thereof, with the adaptor plate being disposed between the engine and the driveshaft housing, comprising the steps of:

securing the electrical components within the interior of an electrical component housing comprising a series of walls defining a housing interior;

connecting external leads to the electrical components and securing the external leads to the housing walls, to thereby form an electrical component module; and mounting the electrical component module to the engine within the valley of the V-shape formed by the cylinder banks by interconnecting the module with the adaptor plate so that the module is supported at least in part by the adaptor plate.

13. A method of mounting electrical components to an internal combustion engine comprising a pair of oppositely slanted cylinder banks providing a V-shape to the engine, wherein the engine comprises the powerhead of an outboard marine propulsion system, with the engine cylinder banks being arranged vertically, and wherein the outboard marine propulsion system comprises a driveshaft housing and an adaptor plate mounted to the upper end thereof, with the adaptor plate being disposed between the engine and the driveshaft housing, comprising the steps of:

securing the electrical components within the interior of an electrical component housing comprising a series of walls defining a housing interior;

connecting external leads to the electrical components and securing the external leads to the housing walls, to thereby form an electrical component module; and mounting the electrical component module to the engine within the valley of the v-shape formed by the cylinder banks by interconnecting the module with the adaptor plate, wherein the step of interconnecting the electrical module with the adaptor plate comprises forming one or more upwardly facing recesses in the adaptor plate, and engaging one or more projections provided on the electrical component housing within the one or more recesses in the adaptor plate.

14. The method of claim 13 further comprising the step of providing resilient material between the one or more projections and the one or more recesses for isolating the electrical component housing from vibrations.

15. The method of claim 13, further comprising the step of connecting the electrical component housing to the engine between the cylinder banks toward the upper end of the housing.

16. The method of claim 15, wherein the electrical component housing includes a front wall facing the engine, and wherein the step of mounting the electrical component housing to the engine comprises providing a mounting flange extending from the rear wall of the housing body portion toward the engine, placing the mounting flange adjacent a mounting surface formed on the engine, and connecting the mounting flange to the mounting surface by engaging a connector member through an opening formed in the mounting flange and into an opening formed in the engine mounting surface.

17. A method of mounting electrical components to an internal combustion engine associated with the powerhead of an outboard marine propulsion system, the outboard marine propulsion system including an adaptor plate to which the engine is mounted, and which is interposed between the engine and the upper end of a driveshaft housing, comprising the steps of:

securing the electrical components within the interior of an electrical component housing comprising a series of walls defining a housing interior;

connecting external leads to the electrical components and securing the external leads to the housing walls to thereby form an electrical component module;

interconnecting the electrical component module with the adaptor plate by engaging one or more projections provided on the electrical component module with one or more upwardly facing recesses formed in the adaptor plate; and connecting the electrical component module to the engine toward the upper end of the electrical component module and spaced above the interconnection of the electrical component module with the adaptor plate.

* * * * *

UNITED STATES PATENT AND TRADEMARK OFFICE
CERTIFICATE OF CORRECTION

PATENT NO. : 5,105,334

DATED : April 14, 1992

INVENTOR(S) : RONALD M. HOLINKA

It is certified that error appears in the above-identified patent and that said Letters Patent is hereby corrected as shown below:

Claim 4, Col. 4, Line 61,
Claim 12, Col. 6, Line 29 and
Claim 13, Col. 6, Line 52:
Before "cylinder", delete "engine".

Claim 13, Col. 6, Line 67:
Before "module", insert -- electrical component --.

Claim 13, Col. 7, Line 1:
After "electrical", insert -- component --.

Signed and Sealed this

Fifteenth Day of June, 1993

Attest:

Michael K. Kirk

MICHAEL K. KIRK

*Attesting Officer* *Acting Commissioner of Patents and Trademarks*